United States Patent
Croset

(10) Patent No.: US 10,611,253 B2
(45) Date of Patent: Apr. 7, 2020

(54) SYSTEM FOR CHARGING ELECTRICAL ENERGY STORAGE ELEMENTS OF A VEHICLE

(71) Applicant: CENTUM ADETEL TRANSPORTATION, Ecully (FR)

(72) Inventor: Alain Croset, Toulouse (FR)

(73) Assignee: CENTUM ADETEL TRANSPORTATION, Ecully (FR)

( * ) Notice: Subject to any disclaimer, the term of this patent is extended or adjusted under 35 U.S.C. 154(b) by 42 days.

(21) Appl. No.: 15/543,787

(22) PCT Filed: Jan. 14, 2016

(86) PCT No.: PCT/FR2016/050064
§ 371 (c)(1),
(2) Date: Jul. 14, 2017

(87) PCT Pub. No.: WO2016/113505
PCT Pub. Date: Jul. 21, 2016

(65) Prior Publication Data
US 2018/0037122 A1    Feb. 8, 2018

(30) Foreign Application Priority Data

Jan. 16, 2015    (FR) ...................... 15 50384

(51) Int. Cl.
*H02J 7/00*    (2006.01)
*B60L 11/18*    (2006.01)
(Continued)

(52) U.S. Cl.
CPC .......... *B60L 11/1824* (2013.01); *B60L 53/11* (2019.02); *B60L 53/30* (2019.02); *B60L 53/53* (2019.02);
(Continued)

(58) Field of Classification Search
CPC . Y02T 10/7005; Y02T 90/14; Y02T 10/7044; Y02T 10/7088; Y02T 10/92;
(Continued)

(56) References Cited

U.S. PATENT DOCUMENTS

| 2011/0248683 A1 | 10/2011 | Young et al. | |
| 2013/0020983 A1* | 1/2013 | Ishikawa | H02J 7/0054 |
| | | | 320/104 |

(Continued)

FOREIGN PATENT DOCUMENTS

| EP | 2469682 A1 | 6/2012 |
| EP | 2523301 A1 | 11/2012 |

OTHER PUBLICATIONS

International Search Report for Application No. PCT/FR2016/050064.

(Continued)

*Primary Examiner* — Nghia M Doan
(74) *Attorney, Agent, or Firm* — Cantor Colburn LLP

(57) ABSTRACT

A charging device for charging an electric vehicle, the electric vehicle comprising at least one electrical energy consumer member and at least one energy storage member in order to enable the electric vehicle to travel within a transport space in which the charging device is located, the charging device being configured to charge the energy storage member of the electric vehicle, when the electric vehicle is proximate to the charging device, the charging device includes: an energy storage device; a voltage regulator; and a connection device; the connection device being configured to electrically connect the energy storage device of the charging device, via the voltage regulator, with the energy storage member of the electric vehicle and to transfer at least partially the electrical energy stored by the energy (Continued)

storage device of the charging device toward the energy storage member of the electric vehicle.

13 Claims, 3 Drawing Sheets

(51) Int. Cl.
*H02J 7/34* (2006.01)
*B60L 53/10* (2019.01)
*B60L 58/16* (2019.01)
*B60L 53/53* (2019.01)
*B60L 53/30* (2019.01)

(52) U.S. Cl.
CPC ............ *B60L 58/16* (2019.02); *H02J 7/0054* (2013.01); *H02J 7/345* (2013.01); *B60L 2200/26* (2013.01); *B60L 2210/10* (2013.01); *B60L 2240/547* (2013.01); *B60L 2240/549* (2013.01); *Y02T 10/705* (2013.01); *Y02T 10/7005* (2013.01); *Y02T 10/7088* (2013.01); *Y02T 10/7216* (2013.01); *Y02T 90/121* (2013.01); *Y02T 90/127* (2013.01); *Y02T 90/128* (2013.01); *Y02T 90/14* (2013.01)

(58) Field of Classification Search
CPC ..... H02J 5/00; B60L 11/1809; B60L 11/1861; B60L 11/1816; B60L 11/1887
USPC ......... 320/107, 109, 112, 121–123, 138, 166
See application file for complete search history.

(56) References Cited

U.S. PATENT DOCUMENTS

| | | | |
|---|---|---|---|
| 2013/0020993 A1* | 1/2013 | Taddeo | H02J 7/0027 320/109 |
| 2014/0347017 A1* | 11/2014 | Sugano | B60L 1/003 320/137 |
| 2016/0023562 A1* | 1/2016 | Parra Ortiz | B60L 11/1816 320/109 |

OTHER PUBLICATIONS

Written Opinion for application PCT/FR2016/050064, dated Oct. 20, 2016, 7 pages.

* cited by examiner

SYSTEM FOR CHARGING ELECTRICAL ENERGY STORAGE ELEMENTS OF A VEHICLE

CROSS REFERENCE TO RELATED APPLICATIONS

This application is a National Stage of PCT Application No. PCT/FR2016/050064 filed on Jan. 14, 2016, which claims priority to French Patent Application No. 15/50384 filed on Jan. 16, 2015, the contents each of which are incorporated herein by reference thereto.

FIELD OF THE INVENTION

The field of the present invention covers the one of the vehicles called «ecological» vehicles and in particular the one of the electric vehicles. It particularly concerns, but not exclusively, the field of electric transport means with self-contained power supply as well as their power supply system. More specifically, the present invention relates to a device for charging an energy storage means used in parallel with an electrical energy source using energy storage devices as buffer devices.

BACKGROUND

Nowadays, most recent electric vehicles used in transport spaces are equipped, in the case of terrestrial transport spaces, with a conventional power supply system, that is to say by wire or more specifically by an overhead line in the case of tramway and/or bus, and by rail, more exactly by a third rail in the case of metro. In most cases, this power supply system comprises an electrical energy transport set, such as cables and/or rails made of bronze, aluminum, steel and/or an alloy of these components in order to allow feeding the electric vehicles by capture of the current transported by the electrical energy transport set. Thus, it allows the passengers to travel between two distinct and distant points within a transport space using transport means. Of course, the transport space is configured to allow the electric vehicle to travel between at least two points of the transport space.

Nonetheless, in order to enable a homogenous and wide coverage of the transport space, this power supply system requires electrified cables to be installed along the transport space. This installation generates considerable costs. Moreover, when the transport space corresponds to a town with an architectural heritage, it is crucial to ensure the preservation of this heritage while integrating ecological and efficient transport means.

There are a few solutions of charging devices. However, their charging times range from thirty seconds to a few minutes. These existing charging devices provide systems whose connection with an electric vehicle is done by an electromechanical device. This electromechanical device considerably increases the time of connection between the device and the electric vehicle, and does not favor a short charging time. In addition, the series connection of the two source elements, that is to say between the energy storage device and the energy storage member, does not allow an accurate regulation of the charging voltage of the energy storage of the electric vehicle. Hence, there is a need for a new technique allowing covering a transport space as wide as possible while preserving the architectural heritage comprised within the transport space.

DISCLOSURE OF THE INVENTION

The present invention aims to solve all or part of the aforementioned drawbacks in the form of a charging device for charging an electric vehicle, said electric vehicle comprising at least one electrical energy consumer member and one energy storage member intended to be charged with electrical energy, to store electrical energy and to transfer this electrical energy to the electrical energy consumer member in order to enable the electric vehicle to travel within a transport space in which the charging device is located, said charging device being configured to charge the energy storage member of the electric vehicle, when the electric vehicle is proximate to said charging device, said charging device comprises:

- an energy storage device; the energy storage device being intended to be charged with electrical energy, to store electrical energy and to transfer this electrical energy;
- a voltage regulator; said voltage regulator being connected in series with the energy storage device so as to form a closed circuit and being configured to transfer the electrical energy stored by the energy storage device; and
- a connection device; the connection device being configured to electrically connect the energy storage device of the charging device, via the voltage regulator, with the energy storage member of the electric vehicle and to transfer at least partially the electrical energy stored by the energy storage device of the charging device toward the energy storage member of the electric vehicle.

Thanks to the arrangements according to the invention, the charging device allows charging the energy storage member of the electric vehicle in a very short time. Indeed, the charging device according to the invention has the advantage of allowing a permanent parallel connection between the energy storage device of the charging device and the voltage converter. In addition, the voltage regulator allows the management of a very accurate charging current, piloted by a control loop.

According to one embodiment, the energy storage device may be configured to operate according to three operating modes:

- a charging mode; the charging mode allows charging the storage device with electrical energy by an electrical energy source;
- a storage mode; the storage mode allows storing electrical energy charged by the charging mode; and
- a transfer mode; the transfer mode allows transferring the electrical energy stored during the storage mode toward the electric vehicle.

According to one embodiment, the charging mode may comprise at least one charging period allowing charging the storage device with electrical energy by an electrical energy source.

According to one embodiment, the storage mode may comprise at least one storage mode allowing storing electrical energy charged during the charging period.

According to one embodiment, the transfer mode may comprise at least one transfer period allowing transferring the electrical energy stored during the storage period toward the electric vehicle.

According to one embodiment, the energy storage device may be configured to operate according to a cycle.

According to one embodiment, the cycle is configured to comprise the charging mode, the storage mode and/or the transfer mode.

According to one embodiment, the cycle is configured to comprise a charging period, a storage period and/or a transfer period.

According to one embodiment, a cycle comprises a plurality of charging period, storage period and transfer period.

According to one embodiment, the cycle is configured to successively reproduce the charging mode, the storage mode and the transfer mode.

According to one embodiment, the storage mode is further configured to allow maintaining the remaining energy resulting from the difference between the electrical energy charged by the charging mode and the electrical energy transferred during the transfer mode.

According to one embodiment, the energy storage member of the electric vehicle comprises a power supply voltage range.

The power supply voltage range allows determining the minimum voltage and the maximum voltage to feed the energy storage member of the electric vehicle.

According to one embodiment, the energy storage member of the electric vehicle comprises a power supply current range.

According to one embodiment, the voltage regulator is configured to regulate the output voltage within the power supply voltage range.

This arrangement allows controlling the output voltage within the power supply voltage range.

According to one embodiment, the voltage regulator is configured to regulate the output current within the power supply current range.

This arrangement allows controlling the output current within the power supply current range.

According to one embodiment, the voltage regulator is configured to regulate the input voltage of the energy storage member of the electric vehicle.

This arrangement allows avoiding damaging the energy storage member of the electric vehicle by applying an uncontrolled input voltage.

According to one embodiment, the voltage regulator is configured to regulate the input current of the energy storage member of the electric vehicle.

This arrangement allows avoiding damaging the energy storage member of the electric vehicle by applying an input current which would be uncontrolled.

According to one embodiment, the voltage regulator is configured to operate according to two charging modes, namely:
  a dynamic mode; the dynamic mode is configured to deliver a time-varying voltage and/or current;
  a constant mode; the constant mode is configured to deliver a nominal voltage value and/or a nominal current value constant over time.

Thus, thanks to this feature, the voltage regulator can adapt to different charging modes.

By constant nominal value, is meant a value whose relative variation is smaller than 20%, in particular smaller than 10% and particularly smaller than 5%.

According to one embodiment, the voltage regulator is configured to regulate the output voltage between 240 V and 1200 V, in particular between 400 V and 1100 V and preferably between 450 V and 1000 V in the dynamic mode.

This arrangement allows a wide power supply range to feed with voltage an energy storage member.

According to one embodiment, the voltage regulator is configured to regulate the output current between 0 A and 2000 A, in particular between 0 A and 1900 A and preferably between 0 A and 1800 A in the dynamic mode.

This arrangement allows a wide power supply range to feed with current an energy storage member.

According to one embodiment, the voltage regulator is configured to regulate the voltage between 500 V and 1000 V, in particular between 550 V and 850 V and preferably between 650 V and 850 V in the constant mode.

This arrangement allows a wide power supply range to feed with voltage an energy storage member.

According to one embodiment, the voltage regulator is configured to regulate the output voltage between −10% and +10%, in particular between −5% and +5% and preferably between −1% and +1% of a nominal value.

This arrangement allows maintaining a voltage a given value.

According to one embodiment, the range of power supply voltage of the energy storage member of the electric vehicle is comprised between 240 V and 1200 V, in particular between 400 V and 1100 V and preferably between 450 V and 1000 V.

This arrangement allows different configurations of the energy storage member of the electric vehicle.

According to one embodiment, the range of power supply current of the energy storage member of the electric vehicle is comprised between 0 A and 850 A, in particular between 0 A and 700 A and preferably between 0 A and 550 A.

This arrangement allows different configurations of the energy storage member of the electric vehicle.

According to one embodiment, the charging device further comprises a control unit.

According to one embodiment, the control unit is configured to be connected to the voltage regulator.

According to one embodiment, the voltage regulator comprises an input and an output.

According to one embodiment, the voltage regulator comprises an input, an output and/or a ground.

According to one embodiment, the voltage regulator comprises a voltage input, a voltage output and/or a ground.

According to one embodiment, the voltage regulator comprises a current input, a current output and/or a reference ground.

According to one embodiment, the voltage regulator and the energy storage device form a permanent closed circuit. According to one embodiment, the control unit comprises a feedback device.

According to one embodiment, the feedback device is configured to be connected to the voltage regulator.

According to one embodiment, the feedback device comprises a current and/or voltage measuring device.

According to one embodiment, the feedback device is configured to measure a current and/or a voltage.

According to one embodiment, the feedback device is configured to measure an impedance and/or a resistance.

According to one embodiment, the feedback device is configured to be connected to the output of the voltage regulator.

According to one embodiment, the feedback device is configured to measure a voltage and/or current value at the output of the charging device.

According to one embodiment, the feedback device is configured to measure a voltage and/or current value over time at the output of the charging device.

According to one embodiment, the feedback device is configured to measure a voltage and/or current value over time at the output of the voltage regulator.

According to one embodiment, the input of the voltage regulator is configured to be connected to the energy storage device.

According to one embodiment, the output of the voltage regulator is configured to be connected to the connection device.

According to one embodiment, the feedback device is configured to inform the control unit on the output of the voltage regulator.

According to one embodiment, the feedback device is configured to transmit the voltage and/or current value measured over time at the output of the charging device to the control unit.

According to one embodiment, the feedback device is configured to transmit the voltage and/or current value measured over time at the output of the voltage regulator to the control unit.

According to one embodiment, the feedback device is connected in series with the output of the voltage regulator and the connection device.

According to one embodiment, the control unit is configured to control the voltage regulator.

According to one embodiment, the control unit is configured to supply a setpoint value to the voltage regulator.

According to one embodiment, the charging device further comprises a safety at the level of the connection device.

According to one embodiment, the charging device further comprises a safety configured to be located between the voltage regulator and the connection device.

This arrangement allows securing the voltage regulator and an electric vehicle connected to the connection device.

According to one embodiment, the charging device further comprises a safety configured to link the voltage regulator with the connection device.

This arrangement allows securing the voltage regulator and an electric vehicle connected to the connection device.

According to one embodiment, the charging device further comprises a safety configured to act independently of the voltage regulator.

This arrangement allows securing the charging device without having a latency time which might harm the voltage regulator.

According to one embodiment, the voltage regulator comprises a chopper.

This arrangement allows regulating the output voltage.

According to one embodiment, the voltage regulator comprises an inverter.

According to one embodiment, the voltage regulator comprises a high-frequency inverter.

According to one embodiment, the voltage regulator comprises a rectifier.

According to one embodiment, the voltage regulator comprises a resonant converter.

According to one embodiment, the voltage regulator comprises a series chopper.

This arrangement allows decreasing the output voltage with regard to the input voltage.

According to one embodiment, the voltage regulator comprises a voltage step-down circuit.

This arrangement allows decreasing the output voltage with regard to the input voltage.

According to one embodiment, the voltage regulator comprises a parallel chopper.

This arrangement allows increasing the output voltage with regard to the input voltage.

According to one embodiment, the voltage regulator comprises a voltage step-up circuit.

This arrangement allows increasing the output voltage with regard to the input voltage.

According to one embodiment, the series chopper is configured to charge the energy storage member.

According to one embodiment, the parallel chopper is configured to supply a voltage higher than the voltage supplied by the energy storage device.

This arrangement allows increasing the voltage supplied by the energy storage device.

According to one embodiment, the energy storage device is configured to supply an input voltage to the voltage regulator.

This arrangement allows supplying the voltage regulator with electrical energy.

According to one embodiment, the chopper comprises an input, an output and/or a ground.

According to one embodiment, the chopper comprises a voltage input, a voltage output and/or a ground.

According to one embodiment, the chopper comprises a current input, a current output and/or a ground.

According to one embodiment, the parallel chopper comprises an input, an output and/or a ground.

According to one embodiment, the energy storage device is configured to supply an input voltage to the parallel chopper.

This arrangement allows supplying the parallel chopper with electrical energy.

According to one embodiment, the parallel chopper comprises a voltage input, a voltage output and/or a ground.

According to one embodiment, the parallel chopper comprises a current input, a current output and/or a ground.

According to one embodiment, the series chopper comprises an input, an output and/or a ground.

According to one embodiment, the series chopper comprises a voltage input, a voltage output and/or a ground.

According to one embodiment, the series chopper comprises a current input, a current output and/or a ground.

According to one embodiment, the energy storage device comprises at least one accumulator.

According to one embodiment, the energy storage device comprises at least one lithium-metal-polymer accumulator.

According to one embodiment, the energy storage device comprises at least one capacitor.

According to one embodiment, the energy storage device comprises at least one double-layer capacitance.

According to one embodiment, the energy storage device comprises at least one capacitance.

According to one embodiment, the energy storage device comprises at least one super-capacitor.

According to one embodiment, the energy storage device comprises at least one super-capacitance.

According to one embodiment, the energy storage device comprises at least one ultra-capacitor.

According to one embodiment, the energy storage device comprises at least one ultra-capacitance.

According to one embodiment, the value of the energy storage device is comprised between 5 Farads and 300 Farads, in particular between 7 Farads and 250 Farads and particularly between 10 Farads and 200 Farads.

According to one embodiment, the parallel chopper is configured to supply an output voltage higher than the input voltage.

According to one embodiment, the voltage regulator comprises a series chopper in series with a parallel chopper.

According to one embodiment, the voltage regulator comprises an inverter in series with a rectifier.

According to one embodiment, the voltage regulator comprises a high-frequency inverter in series with a rectifier.

According to one embodiment, the parallel chopper is configured to supply a voltage at the input of the series chopper.

This arrangement allows adapting both to the input voltage of the parallel chopper and, at the same time, to the output voltage that the series chopper mush supply.

According to one embodiment, the parallel chopper is configured to supply an input voltage to the series chopper.

According to one embodiment, the voltage regulator comprises a series chopper in series with a parallel chopper.

According to one embodiment, the voltage regulator comprises a switched power supply.

According to one embodiment, the control unit comprises a central unit.

This arrangement allows the control unit to regulate and/or manage different information at the input and/or at the output.

According to one embodiment, the control unit is configured to be connected to a chopper.

According to one embodiment, the central unit is configured to be connected to a chopper.

According to one embodiment, the control unit is configured to be connected to a parallel chopper.

According to one embodiment, the central unit is configured to be connected to a parallel chopper.

According to one embodiment, the control unit is configured to be connected to a series chopper.

According to one embodiment, the central unit is configured to be connected to a series chopper.

According to one embodiment, the control unit is configured to be connected to a switched power supply.

According to one embodiment, the control unit is configured to control the voltage regulator.

According to one embodiment, the control unit is configured to control a chopper.

According to one embodiment, the central unit is configured to control a chopper.

According to one embodiment, the control unit is configured to control a parallel chopper.

According to one embodiment, the central unit is configured to control a parallel chopper.

According to one embodiment, the control unit is configured to control a series chopper.

According to one embodiment, the central unit is configured to control a series chopper.

According to one embodiment, the control unit is configured to control a switched power supply.

According to one embodiment, the voltage regulator further comprises a protection.

According to one embodiment, the protection is configured to be integrated to the voltage regulator.

According to one embodiment, the protection is configured to be integrated to the switched power supply.

According to one embodiment, the protection is configured to be connected in series with the chopper.

According to one embodiment, the protection is configured to be connected in series with the parallel chopper.

According to one embodiment, the protection is configured to be connected in series with the series chopper.

According to one embodiment, the protection is configured to be connected in series with the parallel chopper.

According to one embodiment, the protection is configured to be connected between the series chopper and the parallel chopper.

According to one embodiment, the protection is configured to protect the series chopper from an overvoltage originating from the parallel chopper.

According to one embodiment, the connection device comprises actuators.

This arrangement allows actuating the connection device.

According to one embodiment, the connection device comprises hinges.

This arrangement allows hinging the connection device.

According to one embodiment, the connection device comprises a contact.

According to one embodiment, the connection device comprises at least one contact.

According to one embodiment, the contact of the charging device is configured to enable a physical and/or electrical contact.

According to one embodiment, the contact of the charging device is configured to enable a punctual contact.

According to one embodiment, the contact of the charging device is configured to enable a lineal contact.

According to one embodiment, the contact of the charging device is configured to enable a surface contact.

According to one embodiment, the contact of the charging device comprises a pad.

According to one embodiment, the contact of the charging device comprises a pantograph.

According to one embodiment, the contact of the charging device comprises a friction strip.

According to one embodiment, the contact of the charging device comprises a rail.

According to one embodiment, the contact of the charging device comprises a boom.

According to one embodiment, the contact of the charging device comprises a brush.

According to one embodiment, the connection device comprises an instantaneous contact.

By instantaneous, is meant a contact which lasts for a short while, that is to say a duration comprised between 0.1 second and 60 seconds, in particular between 0.1 second and 50 seconds and particularly between 0.1 second and 40 seconds. In other words, an instantaneous contact lasts as long as the energy transfer.

According to one embodiment, the connection device comprises at least one instantaneous contact.

According to one embodiment, the instantaneous contact of the charging device is configured to enable a physical and/or electrical contact.

According to one embodiment, the instantaneous contact of the charging device is configured to enable a punctual contact.

According to one embodiment, the instantaneous contact of the charging device is configured to enable a lineal contact.

According to one embodiment, the instantaneous contact of the charging device is configured to enable a surface contact.

According to one embodiment, the instantaneous contact of the charging device comprises a pad.

According to one embodiment, the instantaneous contact of the charging device comprises a pantograph.

According to one embodiment, the instantaneous contact of the charging device comprises a friction strip.

According to one embodiment, the instantaneous contact of the charging device comprises a rail.

According to one embodiment, the instantaneous contact of the charging device comprises a boom.

According to one embodiment, the instantaneous contact of the charging device comprises a brush.

According to one embodiment, the connection device comprises a sliding contact.

According to one embodiment, the connection device comprises at least one sliding contact.

According to one embodiment, the sliding contact of the charging device is configured to enable a physical and/or electrical contact.

According to one embodiment, the sliding contact of the charging device is configured to enable a punctual contact.

According to one embodiment, the sliding contact of the charging device is configured to enable a lineal contact.

According to one embodiment, the sliding contact of the charging device is configured to enable a surface contact.

According to one embodiment, the sliding contact of the charging device comprises a pad.

According to one embodiment, the sliding contact of the charging device comprises a pantograph.

According to one embodiment, the sliding contact of the charging device comprises a friction strip.

According to one embodiment, the sliding contact of the charging device comprises a rail.

According to one embodiment, the sliding contact of the charging device comprises a boom.

According to one embodiment, the sliding contact of the charging device comprises a brush.

According to one embodiment, the connection device comprises an instantaneous sliding contact.

By instantaneous, is meant a sliding contact which lasts for a short while, that is to say a duration comprised between 0.1 second and 60 seconds, in particular between 0.1 second and 50 seconds and particularly between 0.1 second and 40 seconds. In other words, an instantaneous contact lasts as long as the energy transfer.

According to one embodiment, the connection device comprises at least one instantaneous sliding contact.

According to one embodiment, the instantaneous sliding contact of the charging device is configured to enable a physical and/or electrical contact.

According to one embodiment, the instantaneous sliding contact of the charging device is configured to enable a punctual contact.

According to one embodiment, the instantaneous sliding contact of the charging device is configured to enable a lineal contact.

According to one embodiment, the instantaneous sliding contact of the charging device is configured to enable a surface contact.

According to one embodiment, the instantaneous sliding contact of the charging device comprises a pad.

According to one embodiment, the instantaneous sliding contact of the charging device comprises a pantograph.

According to one embodiment, the instantaneous sliding contact of the charging device comprises a friction strip.

According to one embodiment, the instantaneous sliding contact of the charging device comprises a rail.

According to one embodiment, the instantaneous sliding contact of the charging device comprises a boom.

According to one embodiment, the instantaneous sliding contact of the charging device comprises a brush.

According to one embodiment, the connection device is configured to cooperate with the connection member.

According to one embodiment, the connection device is configured to connect the connection member of the electric vehicle to the charging device.

According to one embodiment, the connection member comprises a contact.

According to one embodiment, the connection member comprises at least one contact.

According to one embodiment, the contact of the electric vehicle is configured to enable a physical and/or electrical contact.

According to one embodiment, the contact of the electric vehicle is configured to enable a punctual contact.

According to one embodiment, the contact of the electric vehicle is configured to enable a lineal contact.

According to one embodiment, the contact of the electric vehicle is configured to enable a surface contact.

According to one embodiment, the contact of the electric vehicle comprises a pad.

According to one embodiment, the contact of the electric vehicle comprises a pantograph.

According to one embodiment, the contact of the electric vehicle comprises a friction strip.

According to one embodiment, the contact of the electric vehicle comprises a rail.

According to one embodiment, the contact of the electric vehicle comprises a boom.

According to one embodiment, the contact of the electric vehicle comprises a brush.

According to one embodiment, the connection member comprises an instantaneous contact.

According to one embodiment, the connection member comprises at least one instantaneous contact.

According to one embodiment, the instantaneous contact of the electric vehicle is configured to enable a physical and/or electrical contact.

According to one embodiment, the instantaneous contact of the electric vehicle is configured to enable a punctual contact.

According to one embodiment, the instantaneous contact of the electric vehicle is configured to enable a lineal contact.

According to one embodiment, the instantaneous contact of the electric vehicle is configured to enable a surface contact.

According to one embodiment, the instantaneous contact of the electric vehicle comprises a pad.

According to one embodiment, the instantaneous contact of the electric vehicle comprises a pantograph.

According to one embodiment, the instantaneous contact of the electric vehicle comprises a friction strip.

According to one embodiment, the instantaneous contact of the electric vehicle comprises a rail.

According to one embodiment, the instantaneous contact of the electric vehicle comprises a boom.

According to one embodiment, the instantaneous contact of the electric vehicle comprises a brush.

According to one embodiment, the connection member comprises an instantaneous sliding contact.

According to one embodiment, the connection member comprises at least one instantaneous sliding contact.

According to one embodiment, the instantaneous sliding contact of the electric vehicle is configured to enable a physical and/or electrical contact.

According to one embodiment, the instantaneous sliding contact of the electric vehicle is configured to enable a punctual contact.

According to one embodiment, the instantaneous sliding contact of the electric vehicle is configured to enable a lineal contact.

According to one embodiment, the instantaneous sliding contact of the electric vehicle is configured to enable a surface contact.

According to one embodiment, the instantaneous sliding contact of the electric vehicle comprises a pad.

According to one embodiment, the instantaneous sliding contact of the electric vehicle comprises a pantograph.

According to one embodiment, the instantaneous sliding contact of the electric vehicle comprises a friction strip.

According to one embodiment, the instantaneous sliding contact of the electric vehicle comprises a rail.

According to one embodiment, the instantaneous sliding contact of the electric vehicle comprises a boom.

According to one embodiment, the instantaneous sliding contact of the electric vehicle comprises a brush.

Thus, thanks to this arrangement, it is possible to reach recharge times ranging from 10 to 15 s for a transferred power up to 1200 kW. These times are not attainable by electromechanical means.

According to one embodiment, the connection device is configured to enable a communication between the electric vehicle and the charging device.

According to one embodiment, the connection device is configured to enable a communication between the electric vehicle and the charging device via power line.

According to one embodiment, the communication between the electric vehicle and the charging device is performed according to the TCP/IP protocol.

According to one embodiment, the charging device further comprises a communication device.

According to one embodiment, the communication device is configured to enable a wireless communication.

According to one embodiment, the communication device is configured to enable a radio-frequency communication.

According to one embodiment, the communication device comprises a coupling/decoupling device.

According to one embodiment, the coupling/decoupling device is configured to decouple the communication from the energy transfer.

According to one embodiment, the coupling/decoupling device is configured to couple the communication to the energy transfer.

According to one embodiment, the coupling/decoupling device is configured to decouple the communication from the power line.

According to one embodiment, the coupling/decoupling device is configured to decouple the communication current from the power line.

According to one embodiment, the connection between the connection device of the charging device and the connection member of the electric vehicle has a duration between 0.1 second and 5 seconds, in particular between 0.3 second and 4 seconds and particularly between 0.5 second and 3 seconds.

This arrangement allows easily contacting the charging device with the electric vehicle.

According to one embodiment, the actuators are configured to displace the contact between an active position and a release position.

According to one embodiment, the connection device is configured to be hinged between the active position in which the connection device is configured to connect the connection member of the electric vehicle, to detect the identification element and to transfer an amount of energy in the storage members of the electric vehicle and the release position in which the connection device is disconnected from the connection member of the electric vehicle.

This arrangement allows easily contacting the charging device with the electric vehicle in the active position and afterwards disconnecting in the release position.

According to one embodiment, the transport space is a terrestrial space, an aerial space and/or a maritime space.

This arrangement allows the electric vehicle to travel within a delimited space.

According to one embodiment, the transport space is a terrestrial transport network.

According to one embodiment, the transport space is an urban, interurban and/or rural transport network.

According to one embodiment, the control unit comprises a communication device.

Advantageously, this arrangement allows the control unit to communicate with the electric vehicle and/or exchange information with the electric vehicle.

According to one embodiment, the communication device comprises a current and/or voltage measuring device.

This arrangement allows measuring an impedance, a current and/or a voltage.

According to one embodiment, the communication device is configured to detect an identification element of a first type and an identification element of a second type.

According to one embodiment, the communication device is configured to differentiate between a first-type identification element and a second-type identification element.

According to one embodiment, the control unit is configured to detect the identification element of the electric vehicle.

According to one embodiment, the connection device is configured to connect the connection member of the electric vehicle, to detect the identification element and to transfer an amount of energy in the storage members of the electric vehicle.

The present invention further concerns a charging terminal for an electric vehicle comprising at least one electrical energy consumer member and one energy storage member intended to be charged with electrical energy, to store electrical energy and to transfer this electrical energy to the electrical energy consumer member in order to enable the electric vehicle to travel within a transport space in which a charging terminal is located, said charging terminal comprises a charging device according to the invention, a voltage converter comprising an input node, an output node, a reference node and a common node, said voltage converter is configured to be connected to the charging device between the output node and the common node.

Thanks to the arrangements according to the invention, the charging terminal allows charging the energy storage member of the electric vehicle in a very short time. Indeed, the charging terminal according to the invention has the advantage of allowing a permanent parallel connection of the two sources of charging energy: the energy storage device of the charging device and the voltage or power regulator fed by the voltage converter and the energy storage device. In addition, the voltage regulator allows he management of a very accurate charging current, piloted by the control loop.

According to one embodiment, the voltage converter comprises a unidirectional device.

This arrangement allows the voltage converter not to have a back voltage and/or current.

According to one embodiment, the voltage converter is configured to be connected in parallel to the energy storage device.

This arrangement allows the voltage converter to charge the energy storage device.

According to one embodiment, the voltage converter is configured to be connected at the input of the voltage regulator.

This arrangement allows the voltage converter to supply an electrical energy to the voltage regulator.

This arrangement allows the voltage regulator to be fed both by the energy storage device and at the same time by the voltage converter.

According to one embodiment, the voltage converter is configured to feed the energy storage device of the charging device with electrical energy.

According to one embodiment, the voltage converter is configured to feed the voltage regulator of the charging device with electrical energy.

According to one embodiment, the voltage converter is configured to feed, in parallel, the energy storage device of the charging device and the voltage regulator of the charging device with electrical energy.

According to one embodiment, the voltage converter is configured to be connected both in parallel to the energy storage device and at the same time in parallel to the voltage regulator.

According to one embodiment, the voltage converter is configured to simultaneously feed the energy storage device of the charging device and the voltage regulator of the charging device with electrical energy.

According to one embodiment, the voltage converter is configured to feed, in parallel, the energy storage device of the charging device and the voltage regulator of the charging device with electrical energy, when the charging device is in the constant mode.

According to one embodiment, the voltage converter is configured to feed, in parallel, the energy storage device of the charging device and the voltage regulator of the charging device with electrical energy, when the charging device is in the dynamic mode.

According to one embodiment, the voltage converter is configured to simultaneously feed the energy storage device of the charging device and the voltage regulator of the charging device with electrical energy, when the charging device is in the constant mode.

According to one embodiment, the voltage converter is configured to simultaneously feed the energy storage device of the charging device and the voltage regulator of the charging device with electrical energy, when the charging device is in the dynamic mode.

According to one embodiment, the charging terminal further comprises a rectifier configured to rectify a voltage.

According to one embodiment, the charging terminal further comprises a rectifier configured to rectify a current.

According to one embodiment, the rectifier is configured to rectify a current.

According to one embodiment, the rectifier is configured to be connected between the input node and the reference node of the voltage converter and to the secondary input node set.

According to one embodiment, the rectifier consists of a diode bridge.

According to one embodiment, the rectifier consists of a Graetz bridge.

According to one embodiment, the voltage converter further comprises a series chopper.

This arrangement allows lowering the output voltage with regard to the input voltage.

According to one embodiment, the voltage converter further comprises a voltage step-down circuit.

This arrangement allows lowering the output voltage with regard to the input voltage.

According to one embodiment, the rectifier is configured to supply a rectified voltage at the input of the chopper of the voltage converter.

According to one embodiment, the rectifier is configured to supply a rectified voltage at the input of the chopper in series with the voltage converter.

According to one embodiment, the rectifier is configured for a rectified voltage at the input of the voltage step-down circuit of the voltage converter.

According to one embodiment, the charging terminal further comprises a safety system.

This arrangement allows securing the charging terminal.

According to one embodiment, the charging terminal further comprises a preload.

This arrangement allows limiting the inrush current which may be considerable, at connection.

The present invention further concerns a charging system comprising a charging terminal according to the invention, an electrical energy source, a transformer comprising a primary circuit and a secondary circuit, said transformer is configured to be connected to the electrical energy source via the charging terminal.

Thanks to the arrangements according to the invention, the charging system can charge by combining, if necessary, an electrical energy source with the electrical energy of the charging device.

According to one embodiment, the transformer is configured to be connected to the electrical energy source.

This arrangement allows modifying the values of input voltage and current.

According to one embodiment, the preload is connected between the transformer and the energy source.

This arrangement allows limiting the inrush current of the transformer when the current is established.

According to one embodiment, the transformer is configured to be connected to the electrical energy source via the primary output node set.

This arrangement allows adapting the values of voltage and current of the electrical energy source to the voltage converter.

According to one embodiment, the transformer is configured to be connected to the charging terminal between the primary output node set and a secondary input node set.

According to one embodiment, the energy source is configured to be connected to the charging terminal via the primary input node set.

According to one embodiment, the transformer is configured to transform an input voltage into an output voltage.

According to one embodiment, the transformer is configured to transform an input current into an output current.

According to one embodiment, the transformer is configured to transform an input power into an output power.

According to one embodiment, the primary circuit of the transformer comprises an input node set of the primary circuit.

According to one embodiment, the secondary circuit of the transformer comprises an output node set of the secondary circuit.

According to one embodiment, the input node set of the primary circuit of the transformer is configured to be connected to the primary output node set of the charging terminal.

According to one embodiment, the output node set of the secondary circuit of the transformer is configured to be connected to the secondary input node set of the charging terminal.

According to one embodiment, the energy source is configured to be connected to the primary input node set of the charging terminal.

According to one embodiment, the energy source comprises an electrical network.

This arrangement allows the charging system to benefit from a continuous supply of energy.

According to one embodiment, the energy source has an electrical power comprised between 1 kVA and 500 kVA, in particular between 5 kVA and 300 kVA and particularly between 10 kVA and 250 kVA.

This arrangement allows the charging system to benefit from a considerable electrical power.

According to one embodiment, the charging system comprises a first operating mode and a second operating mode.

According to one embodiment, the first operating mode is configured to supply a setpoint of the output voltage at the connection device.

According to one embodiment, the first operating mode is configured to cooperate with the constant mode of the charging device.

According to one embodiment, the second operating mode is configured to cooperate with the dynamic mode of the connection device.

The present invention further concerns a charging station for an electric vehicle, said charging station comprises a charging system according to the invention, a charging, stopping and/or parking space comprising an access configured to receive an electric vehicle in said charging, stopping and/or parking space.

Thanks to the arrangements according to the invention, the charging station allows charging an electric vehicle in a charging, stopping and/or parking space.

According to one embodiment, the charging device is integrated to the charging station.

This arrangement allows charging an electric vehicle in defined space.

According to one embodiment, the charging device is integrated to the charging space of the charging station.

This arrangement allows charging an electric vehicle in a defined space and safely.

According to one embodiment, the charging device is integrated to the stopping space of the charging station.

This arrangement allows charging an electric vehicle in the stopping space when the vehicle is at stop.

According to one embodiment, the charging device is integrated to the parking space of the charging station.

This arrangement allows charging an electric vehicle in the parking space when the vehicle is parked.

The present invention further concerns an installation comprising a plurality of charging stations according to the invention, the charging stations being distributed within a transport space so as to enable an electric vehicle to travel within the transport space.

Thanks to the arrangements according to the invention, the installation allows covering a larger transport space without affecting the autonomy of the electric vehicle on the one hand and, on the other hand, while preserving the architectural heritage of the space and while decreasing the installation cost of such an infrastructure.

According to one embodiment, the installation comprises a distance between the charging stations.

According to one embodiment, the installation comprises a transport line.

According to one embodiment, the plurality of charging stations forms a transport line.

The present invention further concerns an electric vehicle comprising at least one electrical energy consumer member and one energy storage member intended to be charged with electrical energy, to store the electrical energy and to transfer this electrical energy to the electrical energy consumer member in order to enable the electric vehicle to travel within a transport space, said energy storage member being configured to be charged by a charging device according to the invention, the electric vehicle further includes a connection member configured to cooperate with the connection device of the charging device and to enable the transfer of electrical energy between an energy storage device of the charging device and the storage means of the electric vehicle when the electric vehicle is proximate to the charging device.

Thanks to the arrangements according to the invention, the electric vehicle may be charged in a very shorter time than conventional electric vehicles and, what is more, the electric vehicle according to the invention is much lighter because it has only the electrical energy storage member onboard without the charging device, and even without the charging system.

Indeed, the absence of the charging device and of the charging system allows lightening the electric vehicle considerably.

According to one embodiment, the energy storage member comprises at least one accumulator.

According to one embodiment, the energy storage member comprises at least one lithium-metal-polymer accumulator.

According to one embodiment, the energy storage member comprises at least one capacitor.

According to one embodiment, the energy storage member comprises at least one double-layer capacitance.

According to one embodiment, the energy storage member comprises at least one capacitance.

According to one embodiment, the energy storage member comprises at least one super-capacitor.

According to one embodiment, the energy storage member comprises at least one super-capacitance.

According to one embodiment, the energy storage member comprises at least one ultra-capacitor.

According to one embodiment, the energy storage member comprises at least one ultra-capacitance.

According to one embodiment, the value of the energy storage member is comprised between 5 Farads and 300 Farads, in particular between 7 Farads and 250 Farads and particularly between 10 Farads and 200 Farads.

According to one embodiment, the electric vehicle further comprises a communication member.

According to one embodiment, the communication member is configured to enable a wireless communication.

According to one embodiment, the communication member is configured to enable a radio-frequency communication.

According to one embodiment, the communication member comprises a coupling/decoupling device.

According to one embodiment, the coupling/decoupling member is configured to decouple the communication from the energy transfer.

According to one embodiment, the coupling/decoupling member is configured to decouple the communication from the power line.

According to one embodiment, the coupling/decoupling member is configured to decouple the communication current from the power line.

According to one embodiment, the communication between the electric vehicle and the charging device comprises an exchange of information.

According to one embodiment, the electric vehicle comprises a control member.

According to one embodiment, the control member is configured to establish the state characteristic elements.

According to one embodiment, the control member is configured to control the state-of-charge of the storage member.

According to one embodiment, the control member is configured to control the state-of-health of the storage member.

According to one embodiment, the control unit is configured to establish an energy transfer value to transfer over time from the state characteristic elements between the charging device and the storage member of the electric vehicle.

According to one embodiment, the control unit is configured to establish an energy transfer value to transfer between the charging device and the storage member of the electric vehicle over time from the state characteristic elements.

According to one embodiment, the control unit is configured to establish calculated voltage and/or current values to transfer over time from the state characteristic elements between the charging device and the storage member of the electric vehicle.

According to one embodiment, the control unit is configured to establish calculated voltage and/or current values to transfer over time from the state-of-charge.

According to one embodiment, the control unit is configured to establish calculated voltage and/or current values to transfer over time from the state-of-health.

According to one embodiment, the control unit is configured to calculate calculated voltage and/or current values to transfer over time from the state characteristic elements.

According to one embodiment, the control member is configured to measure output voltage and/or current values during the transfer of electrical energy, between the charging device and the storage member of the electrical vehicle, at the terminals of the storage member.

According to one embodiment, the control unit is configured to acquire the output voltage and/or current values during the transfer of electrical energy.

According to one embodiment, the control unit is configured to acquire the measured voltage and/or current values during the transfer of electrical energy at the terminals of the storage member.

According to one embodiment, the control unit is configured to integrate the output voltage and/or current values during the transfer of electrical energy to the calculated voltage and/or current values so as to obtain estimated voltage and/or current values.

According to one embodiment, the control unit is configured to integrate the estimated output voltage and/or current values during the transfer of electrical energy to the measured voltage and/or current values so as to obtain corrected voltage and/or current values.

According to one embodiment, the control unit is configured to stop the transfer of energy when the corrected voltage and/or current values correspond to the charging voltage and/or current values.

According to one embodiment, the control member is configured to control the bidirectional converter.

According to one embodiment, the electric vehicle comprises a transport compartment.

According to one embodiment, the transport compartment may receive passengers.

According to one embodiment, the electric vehicle may transport passengers.

According to one embodiment, the electric vehicle may transport at least ten passengers.

According to one embodiment, the energy storage member comprises at least one input terminal and/or at least one output terminal.

According to one embodiment, the energy storage member comprises at least one current input terminal and/or at least one current output terminal.

According to one embodiment, the energy storage member comprises an identification element.

According to one embodiment, the identification element comprises an impedance.

According to one embodiment, the identification element comprises an input impedance.

According to one embodiment, the input impedance comprises only a resistive portion.

Advantageously, the input impedance will be constant regardless of the frequency imposed at its terminal.

According to one embodiment, the identification element comprises a small input impedance.

According to one embodiment, the identification element comprises a small input resistance.

A small resistance and/or a small impedance creates a low dropout voltage.

According to one embodiment, the identification element comprises an impedance comprised between 1.5 mOhm and 1.5 Ohm, in particular between 3 mOhm and 1 Ohm and particularly between 5 mOhm and 30 mOhm.

According to one embodiment, the identification element comprises a resistance comprised between 1.5 mOhm and 1.5 Ohm, in particular between 3 mOhm and 1 Ohm and particularly between 5 mOhm and 30 mOhm.

A resistance and/or an impedance comprised between 1.5 mOhm and 1.5 Ohm, in particular between 3 mOhm and 1 Ohm and particularly between 5 mOhm and 30 mOhm creates a low dropout voltage.

According to one embodiment, the identification element comprises a first-type element and/or a second-type element.

According to one embodiment, the first-type element comprises a resistance comprised between 1.5 mOhm and 1.5 Ohm, in particular between 3 mOhm and 1 Ohm and particularly between 5 mOhm and 30 mOhm.

According to one embodiment, the second-type element has a resistance greater than 30 mOhm and, in particular greater than 1 Ohm and particularly greater than 1.5 Ohm.

According to one embodiment, the electrical energy consumer member comprises a motor.

According to one embodiment, the motor is configured to perform:
  an «acceleration» operation; the acceleration operation allows the motor to increase its rotational speed;
  a «speed keeping» operation; the speed keeping operation allows the motor to maintain its rotational speed constant; and
  a «deceleration» operation; the deceleration operation allows the motor to decrease its rotational speed.

According to one embodiment, the motor comprises an electric motor.

According to one embodiment, the motor comprises a three-phase electric motor.

According to one embodiment, the electrical energy consumer member comprises a set of auxiliary members.

According to one embodiment, the set of auxiliary members is configured to consume a portion of the electrical energy.

According to one embodiment, the electric motor is configured to transform an electrical energy into a translational energy.

According to one embodiment, the electric motor is configured to transform an electrical energy into a drive energy.

According to one embodiment, the electric vehicle further comprises a bidirectional converter.

According to one embodiment, the bidirectional converter is configured to be connected to the energy consumer member and to the energy storage member.

According to one embodiment, the bidirectional converter is configured to be connected in series between the energy consumer member and the energy storage member.

According to one embodiment, the bidirectional converter is configured to operate in an electrical energy consumption mode and/or in an electrical energy generation mode.

According to one embodiment, the bidirectional converter is configured to operate in an electrical energy consumption phase and/or in an electrical energy generation phase.

According to one embodiment, the bidirectional converter is configured to perform:
- an «acceleration» operation; during the acceleration operation, the bidirectional converter increases the transfer of electrical energy from the storage member toward the energy consumer member per unit of time;
- a «speed keeping» operation; during the speed keeping operation, the bidirectional converter maintains the transfer of electrical energy from the storage member to the energy consumer member per unit of time; and
- a «deceleration» operation; during the deceleration operation, the bidirectional converter increases the transfer of electrical energy from the energy consumer member toward the storage member per unit of time.

According to one embodiment, the bidirectional converter is configured to operate according to two modes:
- inverter mode; the inverter mode enables the transfer of energy from the energy storage member toward the energy consumer member; and
- rectifier mode; the rectifier mode enables the transfer of energy from the energy consumer member toward the energy storage member.

According to one embodiment, the bidirectional converter is configured to enable a deceleration operation.

According to one embodiment, the bidirectional converter is configured to enable a speed keeping operation.

According to one embodiment, the bidirectional converter comprises an input set and/or an output set.

The present invention further concerns a method for charging an electric vehicle implemented by a charging device according to the invention, said charging device being configured to charge the energy storage member of the electric vehicle, when the latter is proximate to said charging device, said charging method comprises the following steps:
- connecting the connection device of the charging device with the connection member of the electric vehicle;
- receiving the identification element of the electric vehicle and of the state characteristic elements of the electric vehicle;
- establishing a charging model according to the received state characteristic elements of the electric vehicle;
- transferring an electrical energy, via the voltage regulator, between the charging device and the electric vehicle according to the established charging model;
- regulating the transfer of electrical energy according to the established charging model; and
- disconnecting the connection device of the charging device from the connection member of the electric vehicle.

Thanks to the arrangements according to the invention, the charging method allows charging an electric vehicle according to a charging model.

According to one embodiment, the charging method according to the invention further comprises the following steps:
- verifying the correspondence of the identification elements of the electric vehicle with the first-type verification elements;
- confirming the correspondence of the identification elements of the electric vehicle with the first-type verification elements; and controlling the charging device in the dynamic mode.

According to one embodiment, the charging method according to the invention further comprises the following steps:
- verifying the correspondence of the identification elements of the electric vehicle with the first-type verification elements;
- disconfirming the correspondence of the identification elements of the electric vehicle with the first-type verification elements;
- verifying the correspondence of the identification elements of the electric vehicle with the second-type verification elements;
- confirming the correspondence of the identification elements of the electric vehicle with the second-type verification elements; and
- controlling the charging device in the constant mode.

According to one embodiment, the charging method according to the invention further comprises the following steps:
- emitting an identification request;
- detecting an identification element of the connection member of the electric vehicle by the communication member of the charging device.

According to one embodiment, the identification element of the electric vehicle comprises an identifier.

According to one embodiment, the state characteristic elements of the electric vehicle comprise a voltage, a series input impedance, a state-of-charge value and/or a state-of-health value.

According to one embodiment, the state characteristic elements of the electric vehicle comprise a representation of the voltage of the energy storage member of the electric vehicle, a representation of the series input impedance of the energy storage member of the electric vehicle, a representation of the state-of-charge value of the energy storage member of the electric vehicle, and/or a representation of the state-of-health value of the energy storage member of the electric vehicle.

According to one embodiment, the control unit is configured to stop the transfer of energy when the corrected voltage and/or current values correspond to the charging voltage and/or current values of the established charging model.

According to one embodiment, the control unit is configured to archive the measured values, the estimated values and/or the corrected values with the identification element of the electric vehicle, the state-of-charge and/or the state-of-health.

Other features and advantages of the invention will appear better upon reading the following description of an embodiment of the invention given as a non-limiting example.

BRIEF DESCRIPTION OF THE DRAWINGS

The invention will be better understood using the detailed description which is exposed hereinbelow with reference to the drawing, in which.

In the following detailed description of the figures defined hereinabove, the same elements or the elements filling identical functions may keep the same references so as to simplify the understanding of the invention.

Figure 1:
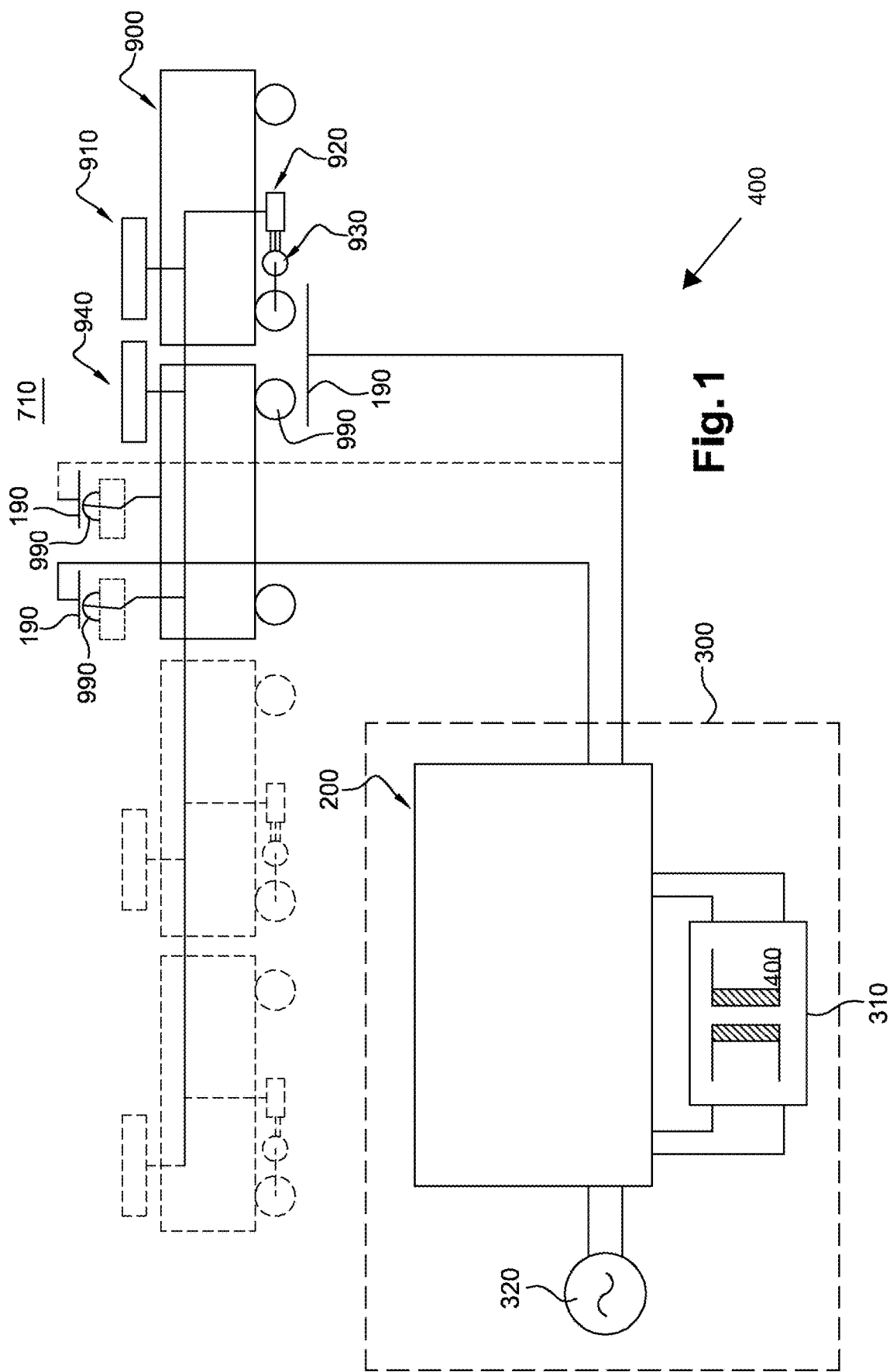
FIG. 1 represents an example of an electric vehicle charging in which the charging device according to the invention is implemented.

In the following description, the features and the functions well known to those skilled in the art will not be described in detail.

DESCRIPTION OF AN EMBODIMENT OF THE INVENTION

General Principle

The general principle of the invention is based on charging of an electric vehicle 900 using a charging device 100 within a transport space 710. The electric vehicle 900, for example a tramway 900, comprises at least one electrical energy consumer member, at least one electric motor 930 for example, and an energy storage member 910. The energy storage member 910, a super-capacitor for example, is configured to be charged with electrical energy and to transfer this electrical energy to the electrical energy consumer member, that is to say to the electric motor 930. The electrical energy consumer member is configured to transform this electrical energy into a mechanical energy, more exactly into a translational energy, and therefore allows the electric vehicle 900 to travel within a transport space 710. When the electrical energy is partially consumed, it is sometimes necessary to charge the energy storage member 910 of the electric vehicle 900 in a place allowing charging and/or recharging the energy storage member 910 and allowing the electric vehicle 900 to continue traveling within the transport space 710 and transporting passengers between two stations. Under certain circumstances, it may be advantageous to charge the energy storage device 110 of the electric vehicle 900 rapidly in order to avoid a useless immobilization of the electric vehicle 900. For example, when the electric vehicle 900 stops at a stop station in order to allow passengers to get on and/or descend.

Since the stoppage of the electric vehicle 900 at the stop station does not exceed thirty seconds in certain cases, more conventionally twenty seconds, charging of the energy storage member 910 should not exceed this time frame. The recharge solutions currently implemented are not satisfactory because their recharge times last between thirty seconds to a few minutes. Among these solutions, certain can actually charge in less than thirty seconds. However, the power delivered by these solutions does not exceed 100 kW. This is due to the very complex circuit which must supply a considerable power within a very short time frame in the range of 10 to 15 seconds and at the same time charge energy storage elements between two recharges.

Other recharge devices provide systems, whose energy storage elements are charged and discharged via contactors. These contactors have a charging position in which the energy storage element is charged by a charger and afterwards discharged via the same charger toward a battery of an electric vehicle. However, when the contactors change position, it is crucial for the charger to wait for an «inertia» time. Actually, in this type of chargers, the alternating current of the electrical network is transformed into a direct current. Most of the time, it consists in lowering the voltage and afterwards converting the alternating current into a direct current. This conversion step involves capacitors comprising large capacitances in the range of a few tens milliFarads and which store this energy before restituting it. An inductive element is added thereon, typically a coil of a few milli-Henry, which will also store energy but will restitute it after a delay period.

Henceforth, when the charger has finished charging the energy storage elements, a portion of the electrical energy, which has served in charging the energy storage elements, remains trapped within the charger and when an electric vehicle arrives in front of the charger, the trapped electrical energy is released in a violent and uncontrolled manner into the electric vehicle, in the same way as an electrostatic discharge. A solution would be to discharge the trapped electrical energy into resistances, which would not be very economic, or wait for the trapped electrical energy to dissipate within the electrical circuit. This last solution would considerably decrease the charging time between two discharges on the one hand and on the other hand it would considerably increase the time for connection between the device and the electric vehicle.

An object of the present invention is to provide a charging device 100 allowing decreasing the charging time of the energy storage member 910 of the electric vehicle 900. The invention achieves its goal by a charging device 100 comprising an energy storage device 110 capable of storing electrical energy supplied by an energy source 320, a connection device 190 to electrically connect the energy storage device 110 with the energy storage member 910 of the electric vehicle 900 and transfer the energy stored in the energy storage device 110 between the charging device 100 and the electric vehicle 900. More particularly, the present invention allows charging an electric vehicle 900 with a charging terminal 200 allowing a hybrid power supply of the energy storage member 910 of the electric vehicle 900, in other words a power supply simultaneously combining the electrical energy of an electrical energy source 320 and of the energy storage device 110 so that the transfer of electrical energy between the charging terminal 200 and the electric vehicle 900 is performed in a few seconds only.

Thus, the invention greatly improves the transfer of electrical energy between a charging terminal 200 and an electric vehicle 900, and optimizes the infrastructure costs of a transport space 710 by decreasing the stop times of the electric vehicle 900 when in operation.

General Description of an Embodiment

FIG. 1 is a schematic illustration of a portion of an installation according to the invention comprising a charging station 400 according to the invention and an electric vehicle 900 configured to transport passengers according to the invention. In this example, it will be considered that the electric vehicle 900, for example a tramway 900, travels within a transport space 710 and that the tramway 900 is configured to transport passengers within the transport space 710 in which at least one charging station 400 according to the invention is disposed. In the example of FIG. 1, the transport space 710 comprises an urban, interurban and/or rural space, and a railroad transport network enabling the tramway 900 to travel between two charging stations 400.

For clarity reasons, the transport space 710 has been simplified and represents a portion of the railroad transport network. Still for simplicity, one single charging station 400 has been represented as well as one single tramway 900.

In this instance, the portion of the railroad transport network is constructed in open air. Of course, this railroad portion is generally embedded in the roadway and therefore enables the roadway to be also usable by other types of electric vehicles 900 such as electric buses and/or vehicles equipped with heat engines or other vehicles allowed to circulate on a roadway, such as for example a bicycle. Moreover, since in certain cases, it may consist of a metro-type electric vehicle, the railroad transport network would naturally be underground in this case.

The tramway 900 travels on the railroad along a predetermined line within the transport space 710 in order to form a transport line in the railroad transport network. In general, a transport line refers to a course made in the railroad transport network in order to enable the electric vehicle 900 to travel between a departure place and a destination place, in other words between two places. Typically, a transport line may comprise a course over several kilometers, and even over ten kilometers and in certain cases twenty kilometers and a plurality of charging stations which mark out the transport line. Each charging station 400 may be separated from the next charging station 400 which precedes it immediately or which follows it immediately along this transport line by a distance D.

This distance D corresponds to the minimum distance D that the tramway 900 should go through in order to pass from a charging station 400 that it has just quitted to the next charging station 400. According to certain transport lines, the distance separating at least two charging stations 400 may be comprised between 100 m and 1000 m, in particular between 150 m and 850 m and particularly between 200 m and 800 m. The choice of the length of the distance D, separating at least two charging stations, is crucial because in the case where the distance is short, and even too short, this results is increasing the infrastructure costs very substantially and conversely, a long distance, and even a too long distance, implies fitting an electric vehicle 900 with an energy storage member 910 capable of storing a considerable amount of electrical energy, and therefore indirectly increasing the weight of the electric vehicle 900 as well as its electrical energy consumption and even reducing the transport compartment available to transport the passengers. It is understood to those skilled in the art that the last drawback directly induces a loss of profitability.

Figure 2:
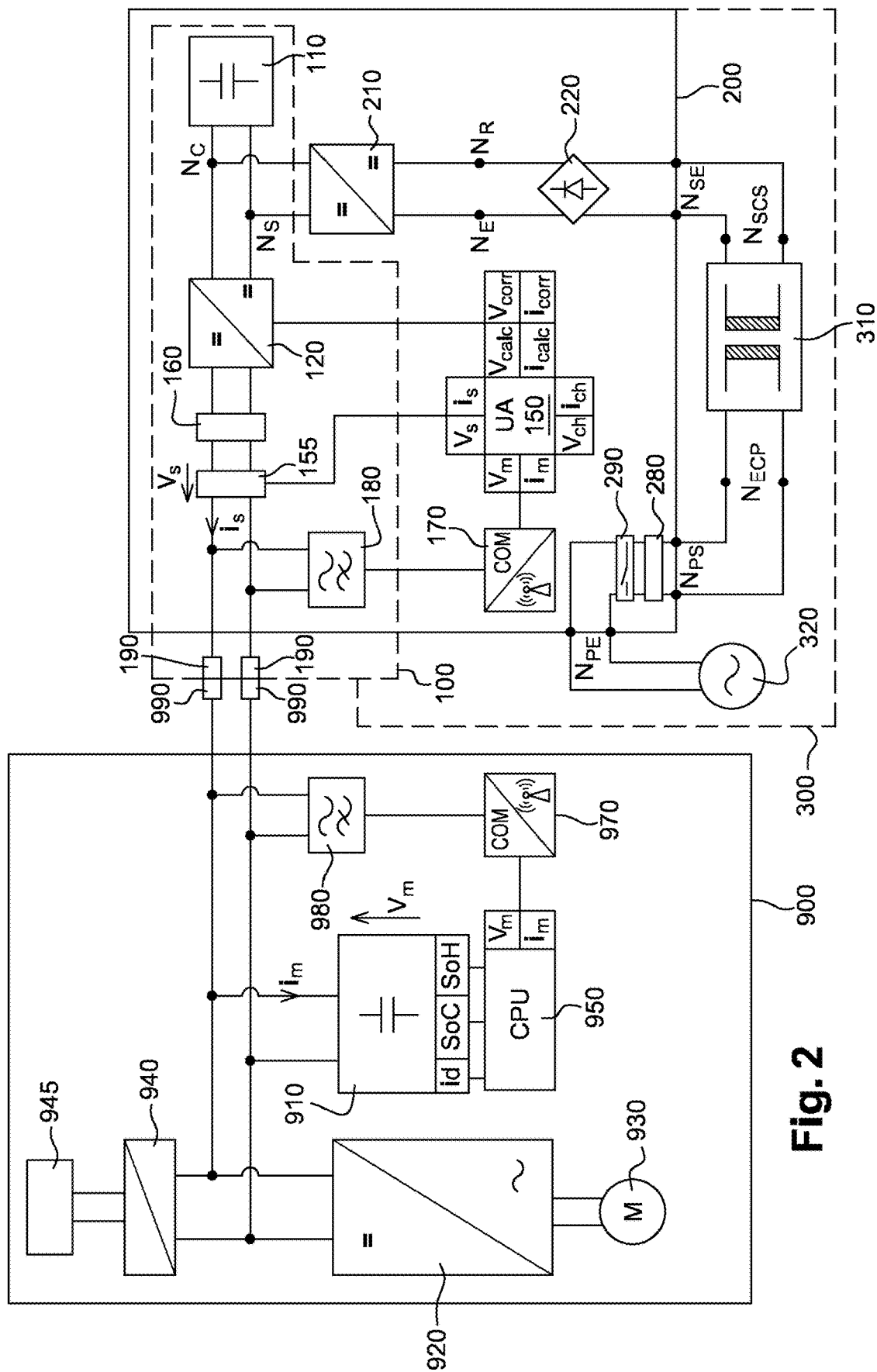
FIG. 2 shows a simplified electrical diagram of the electric vehicle 900 when it is connected to the charging station 400.

FIG. 2 represents the simplified electrical diagram of the electric vehicle 900 when it is connected to the charging station 400. The charging station 400 is installed along the transport line and comprises a charging system 300 for a tramway 900.

The tramway 900 comprises an electrical energy storage member 910 and an energy consumer member. The energy consumer member comprises:
  a bidirectional converter 920; the bidirectional converter 920 is configured to be connected to the electrical energy storage member 910 and to supply a transformed electrical energy;
  an electric motor 930; the electric motor 930 is configured to be connected to the bidirectional converter 920 and to transform the electrical energy transformed by the bidirectional converter 920 into a translational energy, more exactly into a drive energy;
  a low-voltage generator 940; the low-voltage generator 940 is configured to be connected to the energy storage member 910 and to supply a low voltage; and
  a set of auxiliary members 945; the set of auxiliary members 945 may comprise at least one electrical apparatus 945 connected to the low-voltage generator 940.

The charging station 400 for the tramway 900 further comprises a charging system 300 according to the invention, a charging, stopping and/or parking space comprising an access configured to receive a tramway 900 in said charging, stopping and/or parking space. More specifically, the charging space allows charging the tramway 900 in the charging space, when the tramway 900 is at stop and/or parked.

The charging system 300 comprises a charging terminal 200 according to the invention and a connection device 190 configured to transfer a sufficient and/or necessary amount of energy so that the tramway 900 could travel within the transport space 710 and/or between at least two charging stations 400.

The charging device 100 will now be described in more details with reference to FIG. 2.

The charging device 100, represented in FIG. 2, comprises:
  an energy storage device 110; the energy storage device 110 being intended to be charged with electrical energy, to store electrical energy and to transfer this electrical energy;
  a voltage regulator 120; said voltage regulator 120 being connected in series with the energy storage device 110 so as to form a closed circuit and being configured to transfer the electrical energy stored by the energy storage device 110; and
  a connection device 190; the connection device 190 being configured to electrically connect the energy storage device 110 of the charging device 100, via the voltage regulator 120, with the energy storage member 910 of the electric vehicle 900 and to transfer at least partially the electrical energy stored by the energy storage device 110 of the charging device 100 toward the energy storage member 910 of the electric vehicle 900.

The energy storage device 110 may comprise a capacitor, a super-capacitor better known as super-capacitance, a double-layer capacitor, an ultra-capacitance, and/or a double-layer capacitance. The capacitor 910 of the electric vehicle 900 may have a capacitance whose value may be comprised between 5 Farads and 300 Farads, in particular between 7 Farads and 250 Farads and preferably between 10 Farads and 200 Farads.

The energy storage device 110 may be configured to operate at a voltage comprised between 100 V and 1000 V, in particular between 150 V and 850 V and particularly between 200 V and 700 V. Furthermore, the energy storage device 110 may be configured to operate according to three operating modes:
  a charging mode; the charging mode allows charging the storage device 110 with electrical energy by an electrical energy source 320;
  a storage mode; the storage mode allows storing electrical energy charged by the charging mode; and
  a transfer mode; the transfer mode allows transferring the electrical energy stored during the storage mode toward the electric vehicle 900 for example.

The energy storage device 110 may be configured to operate at a voltage comprised between 100 V and 1000 V, in particular between 150 V and 850 V and particularly between 200 V and 700 V. More particularly, the energy storage device 110 may be configured to operate in the charging mode or in the transfer mode at a voltage comprised between 100 V and 1000 V, in particular between 150 V and 850 V and particularly between 200 V and 700 V.

In addition, the energy storage device 110 may also be configured to operate at a current comprised between 0 A and 850 A, in particular between 0 A and 700 A and preferably between 0 A and 550 A. More particularly, the energy storage device 110 may be configured to operate in the charging mode or in the transfer mode at a current comprised between 0 A and 850 A, in particular between 0 A and 700 A and preferably between 0 A and 550 A. Of course, these values of current and voltage may evolve with the new technology generations.

The aforementioned values, that is to say the voltage values and/or the current values, are supplied by the energy storage device 110 to the voltage regulator 120. Besides, these values may be considered as sufficient and/or necessary to enable the energy storage device 110 to charge the energy storage member 910 of the tramway 900 via the connection device 190 so that the tramway 900 could travel within the transport space 710.

This energy transfer takes place via the voltage regulator 120 through the connection device 190. The voltage regulator 120 is configured to regulate the output voltage and/or the output current, respectively, within a power supply voltage range and/or a power supply current range in order to feed the energy storage member 910 of the electric vehicle 900 and more specifically in order to enable the transfer of electrical energy between the energy storage device 910 of the charging device 100 and the energy storage member 910 of the electric vehicle 900 via the connection device 190. The power supply range of the storage means is comprised between 240 V and 1200 V, in particular between 400 V and 1100 V and preferably between 450 V and 1000 V.

The voltage regulator 120 comprises a chopper (not represented), more exactly the voltage regulator 120 comprises a parallel chopper (not represented) in series with a series chopper (not represented) and a unidirectional device (not represented) in order to avoid a back current. The latter is integrated in the chopper(s). Moreover, in order to avoid an overvoltage from the parallel chopper to the series chopper, a protection may be disposed between the two. In this description, the operating mode of a chopper will not be described in details since the operating mode of a chopper, whether it is a series chopper or a parallel chopper, is well known to those skilled in the art.

As can be observed in FIG. 2, the parallel chopper— «boost converter»—is connected downstream of the storage device 110, so as to form a closed circuit and upstream of the series chopper—«buck converter»—in the current flow direction when the charging device 100 is in the transfer mode, that is to say when the electrical energy is transferred from the energy storage device 110 toward the energy storage member 910.

In this configuration, the energy storage device 110 is configured to supply an input voltage to the parallel chopper comprised between 100 V and 1000 V and/or to supply an input current to the parallel chopper comprised between 0 A and 850 A. In turn, the parallel chopper is configured to supply from the input voltage supplied by the energy storage device 110 an output voltage higher than the latter. Actually, the parallel chopper operates as a voltage step-up circuit and therefore allows supplying a positive difference between the output voltage and the input voltage. In contrast, the series chopper operates as a voltage step-down circuit and therefore allows supplying a negative difference between the output voltage and the input voltage. Thus, advantageously, the voltage regulator 120 can regulate the output voltage within a wide voltage range, that is to say between 240 V and 1200 V.

This voltage regulation may be constant and/or dynamic. Indeed, the voltage regulator 120 is configured to operate according to two operating modes: a constant mode and/or a dynamic mode.

In the case of a constant regulation, that is to say in the case where the voltage regulator 120 is configured to operate according to the constant mode, the output voltage and/or current are regulated so that the value (of the output voltage and/or current) is comprised within ±1% with regard to a nominal value (of the output voltage and/or current). This setting may be performed by default, that is to say that the setting may be performed during the manufacture of the voltage regulator 120, and/or it may be performed by the user by setting the output voltage and/or current value via a control unit 150.

Actually, the control unit 150 is configured to be connected to the voltage regulator 120 and/or to control the voltage regulator 120. Thus, it may be possible to enable the voltage regulator 120 to regulate a voltage and/or a current over time in a constant manner and/or in a dynamic manner. Indeed, it may be necessary to regulate the output voltage according to the input voltage supplied by the energy storage device 110, the output voltage of the energy storage device 110 may vary over time when the energy storage device 110 transfers the stored electrical energy toward the voltage regulator 120. Advantageously, this allows the voltage regulator 120 to supply an output voltage and/or current independently of its input voltage and/or current. Therefore, the control unit 150 advantageously allows regulating the output voltage of the voltage regulator 120 thanks to a feedback device 155 allowing the control unit 150 to be informed on the output voltage and at the same time maintaining this value and/or according to an established model. The establishment of this model M will be described in more details later on in this description.

Therefore, since high voltages and/or high currents are involved during the transfer of energy between the energy storage device 110 of the charging device 100 and the energy storage member 910 of the electric vehicle 900, the charging device 100 further comprises a safety 160 at the level of the connection device 190. This safety is configured to link the voltage regulator 120 with the connection device 190 and to act independently of the voltage regulator 120. This arrangement has the advantage of isolating the voltage regulator 120 from the connection device 190 in the case where the variation of the output current of the regulator within a given time interval is too considerable.

Indeed, under certain circumstances, the charging device 100 must supply a very considerable voltage and/or current. To do so, a charging system 300 comprising a charging terminal 200 according to the invention may facilitate a more considerable energy transfer, more exactly a charging system 300 may allow supplying an additional amount of electrical energy.

As can be observed in FIG. 2, the charging terminal 200 comprises a charging device 100 according to the invention, a voltage converter 210 comprising an input node NE, an output node NS, a reference node NR and a common node NC. The voltage converter 210 is configured to be connected to the charging device between the output node NS and the common node NC and to supply a direct voltage and/or a direct current to the charging device 100. Upstream of the voltage converter 210, a rectifier 220 is connected between the input node NE and the reference node NR.

The charging terminal is comprised within a charging system 300. The latter comprises an electrical energy source 320, a transformer 310 comprising a primary circuit and a secondary circuit, said transformer is configured to be connected to the electrical energy source 320 via the charging terminal 200. The aforementioned rectifier 220 is configured to link the transformer 310 to the voltage converter 210. Actually, the rectifier is configured to rectify the voltage and/or the current between the secondary input node set NSE and the input node NE and the reference node NR.

The primary circuit of the transformer 310 is provided with an input node set of the primary circuit NECP and the secondary circuit of the transformer 310 has an output node set of the secondary circuit NECS.

Indeed, the charging terminal further comprises a primary input node set NPE, a primary output node set NPS and a secondary input node set NSE. In turn, the transformer 310 is configured to be connected to the charging terminal between the primary output node set NPS and the secondary input node set NSE. More exactly, the primary circuit of the transformer 310 is connected to the input node set of the primary circuit NECP via the primary input node set NPE and the secondary circuit of the transformer 310 is connected to the output node set of the secondary circuit NSCS via the secondary input node set NSE. This configuration allows integrating a preload 280 and a safety system 290 mounted in series between the primary input node set NPE and the primary output node set NPS.

Thanks to this arrangement, the charging terminal 200 may combine the electrical energy supplied by the energy source and the electrical energy stored in the energy storage device 110 to the electric vehicle 900 through a voltage regulator 120. More specifically, the charging device 100 may combine the electrical energy supplied by the energy source 320 and the electrical energy stored in the energy storage device 110 to the electric vehicle 900 through the voltage regulator 120. Thus, a hybrid power supply is created by associating the electrical energy of the voltage converter 210 with the electrical energy stored in the energy storage device 110.

The connection device 190 comprises pads (not represented) which are hinged by hinges (not represented) by means of actuators (not represented). More exactly, the connection device 190 is configured to be hinged between an active position in which the pads are configured to connect the connection device 190 with the connection member 990 of the electric vehicle 900 and to transfer an amount of energy in the storage member 910 of the electric vehicle 900 and a release position in which the pads are disconnected from the connection member 990 of the electric vehicle 900. Of course, the connection between the pads of the charging device 100 and the connection member 990 of the electric vehicle 900 takes place when the charging device 100 and the electric vehicle 900 are proximate to each other and/or at stop.

When the tramway 900 is proximate to the charging device 100, more exactly when the tramway 900 accesses to the charging, stopping and/or parking space of the charging station 400, the pads connect to the connection member 990 of the tramway 900. This connection operation has a duration comprised between 0.1 second and 5 seconds, in particular between 0.3 second and 4 seconds and particularly between 0.5 second and 3 seconds.

During this connection operation, the charging device 100 and the tramway 900 exchange information before proceeding to the energy transfer according to the charging method.

Presentation of the Steps of the Charging Method

Figure 3:
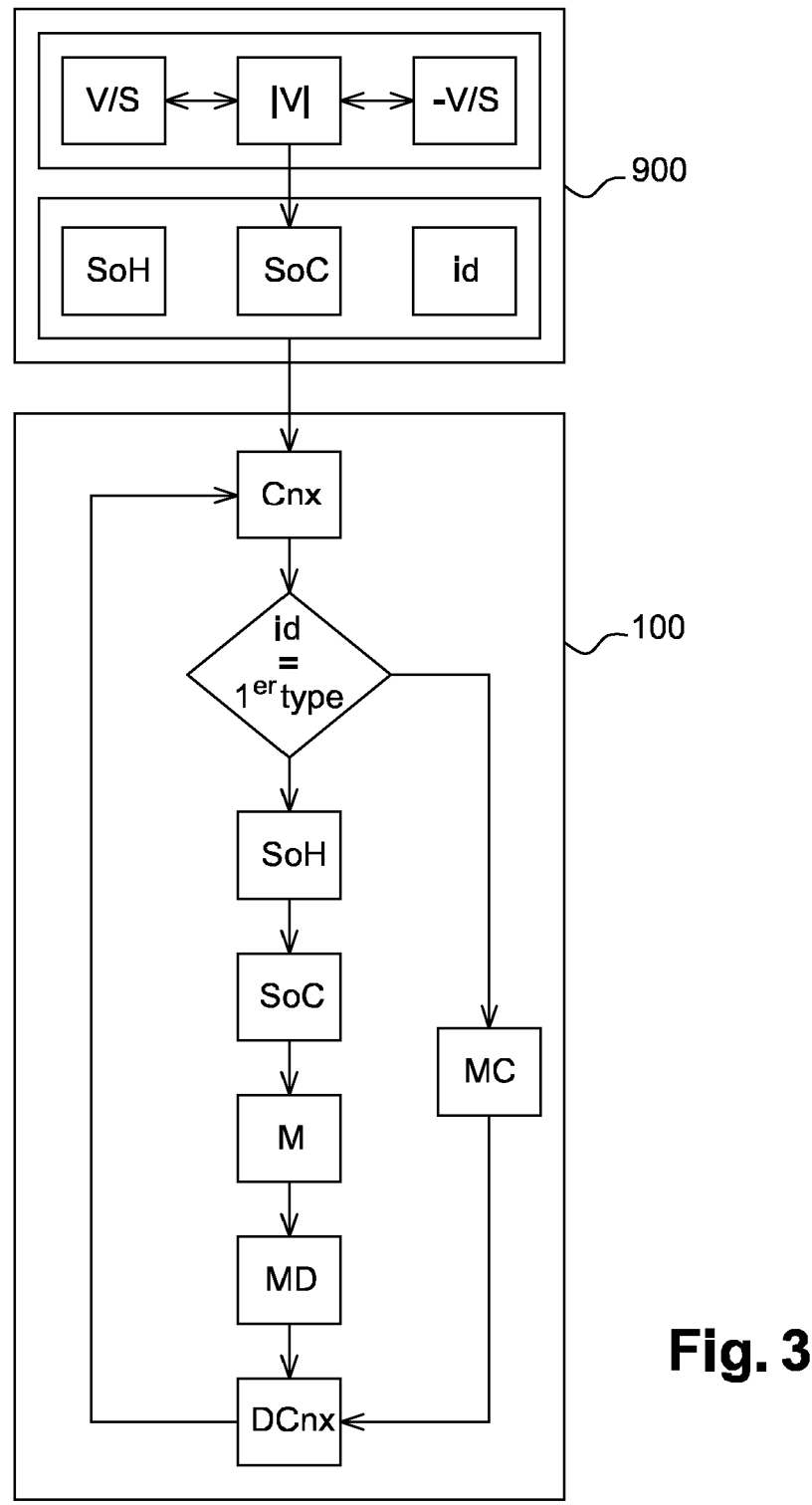
FIG. 3 illustrates a charging method.

The operation of the charging system is described with regard to the charging method of FIG. 3, while considering, in a first time, the approach of the electric vehicle 900, that is to say in this particular case a tramway 900, where the latter approaches proximate to the charging station 400. The charging method described in the following description will be explained while considering as a starting point of the explanation the instant where the tramway 900 leaves the charging station 400 to join a charging station 400.

At the translation step, the tramway 900 travels between two charging stations 400 through a translation phase. During this step, the tramway 900 leaves, for example, the charging station 400 and travels on the transport line toward the next charging station 400. During the translation step, the tramway 900 performs, alternately, an electrical energy consumption phase comprising an acceleration operation V/s and a speed keeping operation |V|, and an electrical energy generation phase comprising a deceleration operation −V/s.

During the energy consumption phase, the bidirectional converter 920 draws in the electrical energy stored in the energy storage member 910. This energy is subsequently consumed by the electric motor 930 as well as the bidirectional converter 920, in order to supply an alternating current to the electric motor 930. This electrical energy consumption by the electric motor 930 enables a translational movement of the tramway 900 within the transport space 710.

This energy is subsequently consumed by the set of auxiliary members, the electric motor 930 as well as the bidirectional converter 920, in order to supply an alternating current to the electric motor 930. This electrical energy consumption by the electric motor 930 enables a translational movement of the tramway 900 within the transport space 710.

During the energy consumption phase, more particularly, during the acceleration and speed keeping operations, the bidirectional converter 920 operates in the inverter mode and the electric motor 930 enables, via a set of wheels, the translation of the electric vehicle 900.

During the energy generation phase, more exactly, during the deceleration operations—V/s, the bidirectional converter 920 operates in the rectifier mode and the electric motor 930 operates as a current/voltage generator, in other words as an electrical energy generator.

Indeed, the electrical energy generated by the electric motor 930 is supplied to the bidirectional converter 920 so as to charge the energy storage member 910 during its translation. Since the electrical energy circulates between the energy storage member 910 and the bidirectional converter 920, this energy is perfectly available, during this transfer, to all the auxiliary members.

In parallel to the translation step, the control member measures the situation of the tramway 900. Part of the measurements comprises a general state of the energy storage member 910. For simplicity, it will be considered that a control member 950 measures a state-of-charge SoC of the storage member 910 and a state-of-health SoH of the energy storage member 910:

the state-of-charge SoC comprises an indicator of the charge level of the energy storage member 910, more specifically the state-of-charge SoC allows determining the voltage between the input terminal and the output terminal of the energy storage member 910;

the state-of-health SoH comprises an indicator of the wear condition of the energy storage member 910, more specifically the state-of-health SoH allows determining the maximum capacity and the equivalent storage internal resistance of the energy storage member 910.

In this charging method, it is perfectly possible to provide a third step parallel to the translation step and to the measurement step, which would be a telecommunication step. Thus, the tramway 900 may inform a charging station 400 on the general state of the energy storage member 910 and/or be informed on the presence of a charging station 400 nearby and at the same time inform the charging station 400 on the general state of the energy storage member 910. This communication takes place via a communication member 970. Indeed, the communication member 970 is configured to enable a wireless communication, of the Wi-Fi™ type according to the TCP/IP and/or Bluetooth™ protocol for example, with the charging terminal 200. The latter, that is to say the charging terminal, would receive these information via the communication device 170.

Alternatively to a wireless communication, the communication member 970 would comprise a coupling/decoupling member 980. The coupling/decoupling member 980 would be configured to couple and/or decouple the communication from the energy transfer. Indeed, the connection device and the connection member are configured to enable the communication between the electric vehicle and the charging device by «Power Line Carrier» or «Broadband over Power Lines». Henceforth, a coupling/decoupling member 980 linked to the communication member 970 allows coupling and/or decoupling the communication from the energy transfer. In parallel, a coupling/decoupling device 180 linked to the communication device 170 allows coupling and/or decoupling the communication from the energy transfer so as to establish a communication between the control unit 150 and the central unit 950. Indeed, once the communication is coupled and afterwards decoupled from the energy transfer, the communication member, in the case of the electric vehicle, or the communication device, in the case of the charging device, transfers the communication respectively to the central unit or to the control unit. Of course, the communication by power line carrier can take place only when there is an electrical connection between the tramway and the charging device.

Hence, the translation step ends with an immobilization step when the tramway 900 accesses to the charging, stopping and/or parking space of the charging station 400 via the access configured to receive the tramway 900 in this space and is immobilized at the level of the charging terminal 200. When the tramway 900 is positioned with regard to the charging terminal 200, more exactly when the connection device 190 is positioned facing the connection member 990 in order to enable the charging step.

Indeed, the charging step begins by a connection operation «CNX» of the connection device 190 of the charging station 400 with the connection member 990 of the tramway 900. Considering that the connection device 190 of the charging station 400 and the connection member 990 of the tramway 900 are configured to cooperate together, the connection is made more simplified. Nonetheless, in order to ensure a proper electrical connection between the connection device 190 and the connection member 990, the charging device 100, using the feedback device 155, more exactly using a measuring device (not represented), a low current is sent toward the connection member 990 in order to determine the equivalent series resistance—ESR. For example, this measurement may be carried out by a «four-point probe measurement» which is well known to those skilled in the art. In the rest of the charging method, the result of this measurement allows confirming the proper electrical contact at the level of the connection.

Actually, this measurement allows revealing the impedance Z at the level of the connection member 990 and therefore allows determining the identity of the tramway 900 at the same time. This occurs during the operation «id=$1^{st}$ type». The measured impedance Z is comprised between 1.5 mOhm and 1.5 Ohm, in particular between 3 mOhm and 1 Ohm and particularly between 5 mOhm and 30 mOhm. In the case of a measurement by a constant current, those skilled in the art talk about a resistance and the latter is comprised between 1.5 mOhm and 1.5 Ohm, in particular between 3 mOhm and 1 Ohm and particularly between 5 mOhm and 30 mOhm.

Depending on the measured impedance Z, a distinction is made between a first-type element, that is to say an electric vehicle according to the invention, comprising an impedance Z comprised between 1.5 mOhm and 1.5 Ohm, in particular between 3 mOhm and 1 Ohm and particularly between 5 mOhm and 30 mOhm, and a second-type element, that is to say a standard electric vehicle, comprising an impedance Z greater than 30 mOhm and, in particular greater than 1 Ohm and particularly greater than 1.5 Ohm. This distinction allows triggering the dynamic charging operation «MD» in the case of an electric vehicle according to the invention or triggering the constant charging operation «MC» in the case of a standard vehicle.

The dynamic charging operation «MD» allows delivering a time-varying voltage and/or current and the constant charging operation allows delivering a nominal voltage value and/or a nominal current value constant over time.

This impedance value Z allows the charging station 400 and the tramway 900 to perform an exchange of information such as for example an exchange of information on the identification element id of the tramway 900 and/or on its state characteristic elements. As has been specified early in this description, the state characteristic elements of the electric vehicle 900 comprise the state-of-charge SoC and/or the state-of-health SoH of the vehicle (operation «SoH» and «SoC»).

Upon reception of these different information relating to the tramway 900 and of the state characteristic elements of the electric vehicle 900, the charging system establishes, from the state characteristic elements, a charging model M. During the operation «M», the charging model M is determined from the characteristics of the energy storage member 910, more exactly from the state-of-charge SoC and/or from the state-of-health SoH of the energy storage member 910 and enables the transfer of electrical energy by an open-loop regulation.

Indeed, the state-of-charge SoC and/or the state-of-health SoH of the energy storage member 910 will allow establishing the charging voltage $V_{c^h}$ and current $I_{c_h}$ values of the charging model M during the modelling operation «M».

The term open-loop means that the energy transfer is done based on the charging model M but that no communication between the charging system and the tramway 900 is permanently established in order to determine the state-of-charge SoC of the energy storage member 910.

During the transfer of electrical energy, via the voltage regulator 120, between the charging device 100 and the tramway 900, the energy transfer voltage $V_s$ and current $I_s$ values are measured at the output of the charging device 100 by the feedback device 155. These voltage $V_s$ and current $I_s$ measurements are compared with the voltage $V_{ca^{ic}}$ and current $I_{ca^{ic}}$ values from the charging model M during charging.

Indeed, when connecting the connection member 990 of the tramway 900 with the connection device 190 of the charging device 100, the central unit of the tramway 900 transmits the state-of-health SoH of the electrical energy storage member 910 to the control unit 150 of the charging device 100. From the state-of-health SoH, the control unit 150 calculates the maximum voltage and/or current, more exactly the control unit 150 calculates the voltage $V_{ca}^{ic}(t)$ and/or current $I_{ca}^{ic}(t)$ values to transfer over time.

In other words, at a regular time interval, or at a fixed frequency, a current and voltage value at the terminals of the energy storage member 910 is estimated, more exactly are estimated from the measured output values ($V_s(t)$; $I_s(t)$) and from the calculated values ($V_{ca}^{ic}(t)$; $I_{ca}^{ic}(t)$).

In order to avoid any deviation between the measured values ($V_s(t)$; $I_s(t)$) and the calculated values ($V_{ca}^{ic}(t)$; $I_{ca}^{ic}(t)$) from the model, a correction unit corrects the divergences between the data by considering the values of the charging model M as reference in order to supply estimated voltage $V_{est}(t)$ and current $I_{est}(t)$ values.

If it is possible, certain voltage $V_m(t)$ and current $I_m(t)$ measurements are performed at the terminals of the storage member of the electric vehicle 900 and are sent back toward the control unit 150 via the connection. Indeed, thanks to the permanent link between the electric vehicle 900 and the charging device 100 during the energy transfer operation, the electric vehicle 900 can transmit these measurements by a power line carrier, by using the TCP/IP protocol and by coupling a high-frequency signal to the energy transfer via the coupling/decoupling member 980. Thus, the control unit 150 can receive these measurements by decoupling them from the energy transfer via the coupling/decoupling device 180.

The control unit 150 then compares the voltage $V_{est}(T)$ and current $I_{est}(T)$ values estimated at a specific instant (T) with the voltage $V_m(T)$ and current $I_m(T)$ values measured at the same instant (T) in order to supply corrected voltage $V_{corr}(T)$ and current $I_{corr}(T)$ values to avoid a deviation from the charging model M.

These open-loop regulation steps are repeated at a regular interval until the voltage $V_m(T)$ and current $I_m(T)$ values reach the charging voltage $V_{c_h}(T)$ and current $I_{C_h}(T)$ values.

Once the charging values are reached, the connection device 190 of the charging device 100 is disconnected, during the operation «DCNX» from the connection member 990 of the electric vehicle 900 and a new cycle, more exactly, a new charging step of the charging device 100 begins. This charging step of the energy storage device 110 has a duration comprised between 30 seconds and 180 seconds, in particular between 50 seconds and 150 seconds and preferably between 60 seconds and 120 seconds. In parallel, the control unit archives the measured values, the estimated values and/or the corrected values with the identification element of the electric vehicle, the state-of-charge and/or the state of health.

In some cases, it is possible that the electric vehicle 900 arriving at the charging station 400 is not an electric vehicle 900 but rather a standard type tramway 900. Henceforth, the charging step, as previously described, begins by a connection operation «CNX» of the connection device 190 of the charging station 400 with a connection member 990 of a tramway 900.

However, the detection device does not recognize the identification element id of the tramway 900 according to the invention during the operation «id=1$^{st}$ type», that is to say a measured impedance Z comprised between 1.5 mOhm and 1.5 Ohm. The charging device 100 switch on the constant mode and delivers a nominal voltage value and/or a nominal current value constant over time in order to enable the tramway 900 to be charged with electrical energy, during the operation «MC», according to a standard model.

Although the invention has been described in connection with particular embodiments, it goes without saying that it is not limited thereto and that it encompasses on the contrary all variants involving technical equivalents of the described means as well as their combinations if these fall within the scope of the invention.

The invention claimed is:

1. A charging system, comprising:
a charging terminal for an electric vehicle having at least one electrical energy consumer member and at least one energy storage member configured to be charged with electrical energy, to store electrical energy and to transfer this electrical energy to the at least one electrical energy consumer member in order to enable the electric vehicle to travel within a transport space in which the charging system is located, the charging terminal comprising:
a charging device for charging the electric vehicle when the electric vehicle is proximate to the charging device, the charging device comprising:
an energy storage device; the energy storage device configured to be charged with electrical energy, to store electrical energy and to transfer this electrical energy;
a voltage regulator; the voltage regulator being connected in series with the energy storage device so as to form a closed circuit and being configured to transfer the electrical energy stored by the energy storage device; and
a connection device; the connection device being configured to electrically connect the energy storage device of the charging device, via the voltage regulator, with the energy storage member of the electric vehicle and to transfer at least partially the electrical energy stored by the energy storage device of the charging device toward the energy storage member of the electric vehicle;
a voltage converter comprising an input node, an output node, a reference node and a common node, the voltage converter connected to the charging device between the output node and the common node, the voltage converter feeding, in parallel, the energy storage device and the voltage regulator of the charging device with electrical energy;
an electrical energy source, a transformer comprising a primary circuit and a secondary circuit, the transformer is connected to the electrical energy source of the charging system via the charging terminal.

2. The charging system as in claim 1, wherein the voltage regulator is configured to regulate the input voltage of the energy storage member of the electric vehicle.

3. The charging system as in claim 1, wherein the voltage regulator is configured to operate according to two charging modes:
a dynamic mode; the dynamic mode is configured to deliver a time-varying voltage and/or a time-varying current;
a constant mode; the constant mode is configured to deliver a nominal voltage value and/or a nominal current value constant over time.

4. The charging system as in claim 1, further comprising a control unit configured to control the voltage regulator.

5. The charging system as in claim 1, wherein the control unit is configured to enable the transfer of electrical energy, via the voltage regulator, between the charging device and the electric vehicle according to an established charging model.

6. The charging system as in claim 1, wherein the connection device is configured to connect the connection member of the electric vehicle, to detect the identification element and to transfer an amount of energy in the storage members of the electric vehicle.

7. The charging system as in claim 1, further comprising a charging, stopping and/or parking space comprising an access configured to receive the electric vehicle in the charging, stopping and/or parking space.

8. The charging system as in claim 1, wherein the charging system is one of a plurality of charging systems distributed within the transport space so as to enable the electric vehicle to travel within the transport space.

9. The charging system as in claim 1, wherein the electric vehicle further includes a connection member configured to cooperate with the connection device of the charging device and to enable the transfer of electrical energy between the energy storage device of the charging device and the at least one energy storage member of the electric vehicle when the electric vehicle is vicinity of the charging device.

10. A method for charging an electric vehicle, comprising:
providing a charging system, the charging system comprising:
a charging terminal for the electric vehicle, the electric vehicle having at least one electrical energy consumer member and at least one energy storage member configured to be charged with electrical energy, to store electrical energy and to transfer this electrical energy to the at least one electrical energy consumer member in order to enable the electric vehicle to travel within a transport space in which the charging system is located, the charging terminal comprising:
a charging device for charging the electric vehicle when the electric vehicle is proximate to the charging device, the charging device comprising:
an energy storage device; the energy storage device configured to be charged with electrical energy, to store electrical energy and to transfer this electrical energy;
a voltage regulator; the voltage regulator being connected in series with the energy storage device so as to form a closed circuit and being configured to transfer the electrical energy stored by the energy storage device; and
a connection device; the connection device being configured to electrically connect the energy storage device of the charging device, via the voltage regulator, with the energy storage member of the electric vehicle and to transfer at least partially the electrical energy stored by the energy storage device of the charging device toward the energy storage member of the electric vehicle;
a voltage converter comprising an input node, an output node, a reference node and a common node, the voltage converter connected to the charging device between the output node and the common node, the voltage converter feeding, in parallel, the energy storage device and the voltage regulator of the charging device with electrical energy;
an electrical energy source, a transformer comprising a primary circuit and a secondary circuit, the transformer is connected to the electrical energy source of the charging system via the charging terminal;
connecting the connection device of the charging device with a connection member of the electric vehicle;
receiving an identification element of the electric vehicle and of the state characteristic elements of the electric vehicle;
establishing a charging model according to the received state characteristic elements of the electric vehicle;
transferring an electrical energy, via the voltage regulator, between the charging device and the electric vehicle according to the established charging model;
regulating the transfer of electrical energy according to the established charging model; and
disconnecting the connection device of the charging device from the connection member of the electric vehicle.

11. The charging method according to claim 10, further comprising the following steps:
verifying correspondence of the identification elements of the electric vehicle with a first-type verification elements; and
confirming the correspondence of the identification elements of the electric vehicle with the first-type verification elements.

12. The charging method according to claim 10, further comprising the following steps:
emitting an identification request;
detecting an identification element of the connection member of the electric vehicle by the detector of the charging device.

13. The charging method according to claim 10, wherein the state characteristic elements of the electric vehicle comprise a representation of a voltage of the energy storage member of electric vehicle, a representation of a series input impedance of the energy storage member of the electric vehicle, a representation of a state-of-charge value of the energy storage member of the electric vehicle, and/or a representation of a state-of-health value of the energy storage member of the electric vehicle.

* * * * *